US008913079B2

(12) United States Patent
Kojima

(10) Patent No.: US 8,913,079 B2
(45) Date of Patent: Dec. 16, 2014

(54) APPARATUS, A METHOD AND A PROGRAM THEREOF

(75) Inventor: Yosuke Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 389 days.

(21) Appl. No.: 13/274,948

(22) Filed: Oct. 17, 2011

(65) Prior Publication Data

US 2012/0212514 A1  Aug. 23, 2012

(30) Foreign Application Priority Data

Feb. 22, 2011 (JP) .................................. 2011-35700

(51) Int. Cl.
*G09G 5/00* (2006.01)
*G06F 3/048* (2013.01)

(52) U.S. Cl.
CPC ...................................... *G06F 3/048* (2013.01)
USPC .......................................... 345/619; 345/660

(58) Field of Classification Search
CPC ......................... G06F 17/30696; G06F 17/243
USPC .................................................. 345/619, 660
See application file for complete search history.

(56) References Cited

U.S. PATENT DOCUMENTS

| | | | |
|---|---|---|---|
| 5,953,019 A * | 9/1999 | Shimakawa et al. .......... | 345/535 |
| 6,124,856 A * | 9/2000 | Bryan et al. ................... | 715/803 |
| 6,565,610 B1 * | 5/2003 | Wang et al. .................... | 715/210 |
| 2003/0210282 A1 * | 11/2003 | Bosma et al. ................. | 345/845 |
| 2007/0101290 A1 * | 5/2007 | Nakashima et al. .......... | 715/797 |
| 2009/0052787 A1 * | 2/2009 | Satoh ............................ | 382/225 |
| 2010/0225667 A1 * | 9/2010 | Nishiyama et al. ........... | 345/660 |
| 2011/0026828 A1 * | 2/2011 | Balasubramanian et al. | 382/187 |

FOREIGN PATENT DOCUMENTS

| | | | |
|---|---|---|---|
| JP | 2000-082039 A | 3/2000 | |
| JP | 2002-358396 A | 12/2002 | |
| JP | 2009-266188 A | 11/2009 | |

\* cited by examiner

*Primary Examiner* — Maurice L McDowell, Jr.
(74) *Attorney, Agent, or Firm* — Sughrue Mion, PLLC

(57) ABSTRACT

Apparatus and method capable of extracting a part where information highly necessary for a user is displayed without using information registered in advance. The method includes detecting an operation part in a screen, comparing a first screen and a second screen, determining a priority order of objects in the first and second screens based on a result of the comparing and displaying at least one of the objects in the first and second screens on a display device based on the priority order. The screen is changed to the first screen by first operation of the operation part and the screen is changed to the second screen by a second operation of the operation part.

11 Claims, 14 Drawing Sheets

APPARATUS, A METHOD AND A PROGRAM THEREOF

This application is based upon and claims the benefit of priority from Japanese patent application No. 2011-035700, filed on Feb. 22, 2011, the disclosure of which is incorporated herein in its entirety by reference.

BACKGROUND OF THE INVENTION

1. Field of the Invention

The exemplary embodiments of the present invention relate to an apparatus, a method and a program thereof. Especially these embodiments relate to a display part extraction apparatus, a display part extraction method and a computer readable medium thereof capable of extracting a part where information highly necessary for a user is displayed without using information registered in advance

2. Description of the Related Art

Recently, the number of apparatus equipped with a wide screen is increasing. And the number of software for displaying information such as characters, images and videos on the screen in a user-friendly manner is also increasing. As the screen is widened, the work efficiency is improved by displaying multiple windows and applications on one screen, for example, as shown in FIG. 13. However, the display range of each of the windows and applications within the screen is small. Therefore, in a graphical user interface (hereinafter referred to as a "GUI") created on the assumption of being displayed on the whole screen or on an about 80% parts of the screen, such as Web page or mail software and a scheduler, the amount of information is larger than the range which can be displayed on the screen, and only a part of the information is displayed. Therefore, a user is required to perform a scrolling operation in order to obtain information, and the efficiency becomes low. This problem is not limited to the apparatuses equipped with a wide screen but is applied to a portable terminal with a small screen, such as a mobile phone and a PDA.

As solution to this problem, for example, JP-A-2000-82039 discloses a method of getting terminal information and generating display control information. JP-A-2009-266188 discloses a method of grouping and extracting information by an outside operation. JP-A-2002-358396 discloses a method of extracting necessary information by registering a history, an attribute, a search expression or the like in advance.

However, in JP-A-2000-82039, the amount of information to be displayed does not change because only the display size is controlled. In JP-A-2009-266188, it is necessary to perform grouping of information to be displayed, in advance. Therefore, JP-A-2009-266188 can not be applied to a GUI accessed newly. In JP-A-2002-358396, it is necessary to register information for each user in advance and it is also necessary to set and hold profile data for the each user.

An object of the exemplary embodiments of the present invention is to provide an apparatus, a method and a program thereof capable of extracting a part where information highly necessary for a user is displayed without using information registered in advance.

SUMMARY OF THE INVENTION

According to a non-limiting illustrative embodiment, an apparatus comprising: a detecting unit configured to detect an operation part in a screen; a priority order determining unit configured to compare a first screen and a second screen and determine an priority order of objects in the first and second screens based on a result of the comparing, wherein the screen is changed to the first screen by first operation of the operation part and the screen is changed to the second screen by a second operation of the operation part; and a display control unit configured to display at least one of the objects in the first and second screens on a display device based on the priority order.

According to another non-limiting illustrative embodiment, a method comprising: detecting an operation part in a screen; comparing a first screen and a second screen, wherein the screen is changed to the first screen by first operation of the operation part and the screen is changed to the second screen by a second operation of the operation part; determining an priority order of objects in the first and second screens based on a result of the comparing; and displaying at least one of the objects in the first and second screens on a display device based on the priority order.

According to another non-limiting illustrative embodiment, a computer readable medium recording thereon a program for enabling a computer to carry out the following: detecting an operation part in a screen; comparing a first screen and a second screen, wherein the screen is changed to the first screen by first operation of the operation part and the screen is changed to the second screen by a second operation of the operation part; determining an priority order of objects in the first and second screens based on a result of the comparing; and displaying at least one of the objects in the first and second screens on a display device based on the priority order.

BRIEF DESCRIPTION OF THE DRAWINGS

Other features and advantages of various embodiments of the present invention will become apparent by the following detailed description and the accompanying drawings, wherein.

DETAILED DESCRIPTION OF THE PREFERRED EMBODIMENTS

A first exemplary embodiment of the present invention will be described in detail below.

(1) First Exemplary Embodiment

Figure 1:
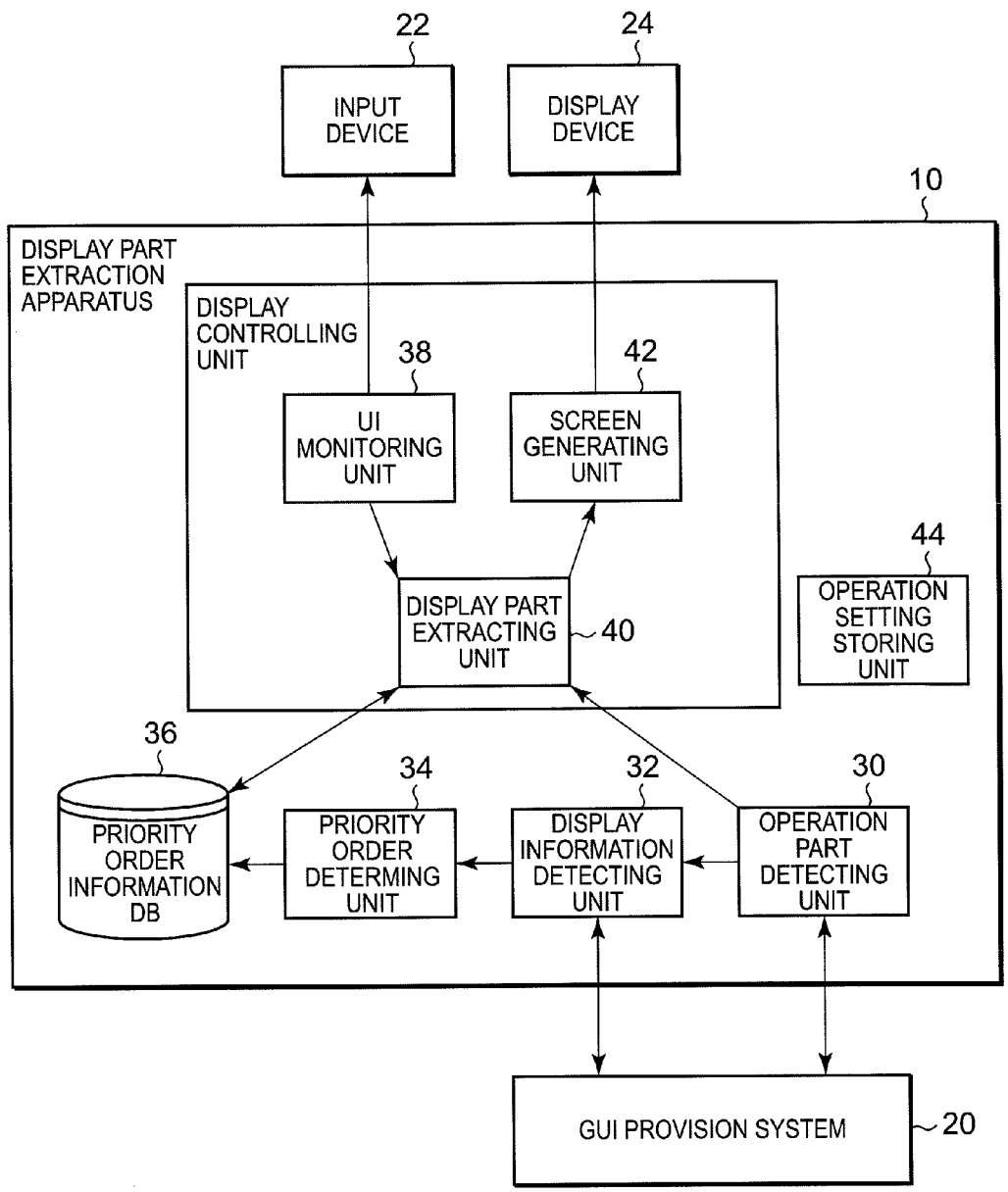
FIG. 1 is a diagram showing the configuration of a display part extraction apparatus in a first exemplary embodiment of the present invention.

FIG. 1 is a diagram showing the configuration of a display part extraction apparatus as an apparatus in the first exemplary embodiment of the present invention. A display part extraction apparatus 10 is an information processing apparatus which extracts and displays a part where information highly necessary for a user is displayed, in a GUI provided by a GUI provision system 20.

Here, the GUI provision system 20 is a system which generates, for example, GUI information (display information) generated by a Web server or various applications in response to a user request. The GUI information is, for example, information created in an HTML or XML format, and it includes information displayed at multiple display target parts as objects on a screen. For example, the information displayed at the display target parts includes images and text. The GUI provision system 20 is configured by one or more systems. For example, if a certain Web site is linked to another Web site, the GUI provision system 20 include the system of the link-source Web site and the system of the link-destination Web site. In this embodiment, the GUI provision system 20 will be described as providing GUI information such as a Web page for users via a network such as the Internet. However, the GUI provision system 20 is not limited thereto. For example, the GUI provision system 20 may operate in a user terminal.

FIG. 1 shows an input device 22 and a display device 24. The input device 22 is an input interface, for example, a mouse and keyboard, a touch panel or the like. The display device 24 is a display interface, for example, a liquid crystal display, an organic EL display or the like.

As shown in FIG. 1, the display part extraction apparatus 10 is configured to include an operation part detecting unit 30 as a first detecting unit, a display information detecting unit 32 as a second detecting unit, a priority order determining unit 34, a priority order information database (DB) 36, a user interface (UI) monitoring unit 38, a display part extracting unit 40, screen generating unit 42 and an operation setting storing unit 44.

The display part extraction apparatus 10 can be configured, for example, in a user terminal such as a personal computer and a mobile terminal or can be configured as an information processing apparatus separate from a user terminal. In any of the cases, the operation part detecting unit 30, the display information detecting unit 32, the priority order determining unit 34, the UI monitoring unit 38, the display part extracting unit 40 and the screen generating unit 42 can be realized by a processor executing a program stored in a memory. The priority order information DB 36 and the operation setting storing unit 44 can be realized with the use of a storage area of the memory, a storage device or the like. The priority order information DB 36 and the operation setting storing unit 44 may be provided, either inside or outside the display part extraction apparatus 10. In this embodiment, a display controlling unit is constituted by the UI monitoring unit 38, the display part extracting unit 40 and the screen generating unit 42.

The operation part detecting unit 30 refers to GUI information on a screen currently displayed on the display device 24 (current screen) and detects a part where a user operation is possible (an operation part) in the current screen. Here, the operation part is a part where a user operation by the input device 22 is possible, for example, a radio button, a checkbox, a text box, a link or the like. As for a method for checking an operation part, a well-known method can be used, such as a method of analyzing a GUI as an image and a method of analyzing a source such as HTML.

Figure 2:
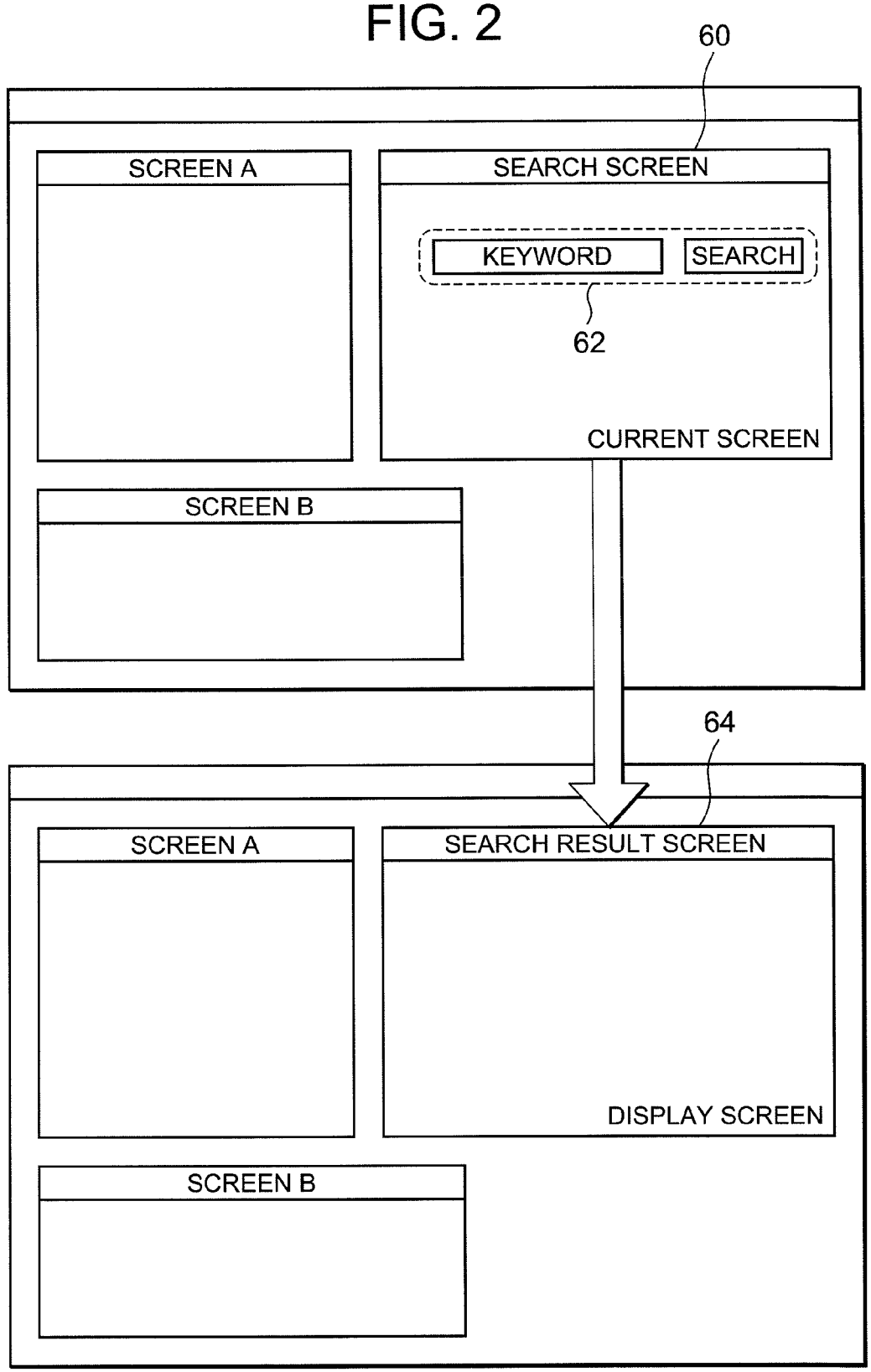
FIG. 2 is a diagram showing an example of screen transition.

FIG. 2 shows an example of screen transition. As shown in FIG. 2, a search screen 60 (current screen) on which a Web page is displayed includes an operation part 62 for inputting a search keyword. When a search keyword is inputted at this operation part 62, a screen 64 (display screen) showing a search result is displayed. In this way, the screen 64 is displayed in response to a user operation on the screen 60. In this embodiment, a screen which is previously displayed is called as a "current screen", and a screen displayed in response to a user operation on the current screen is called as a "display screen".

Figure 3:
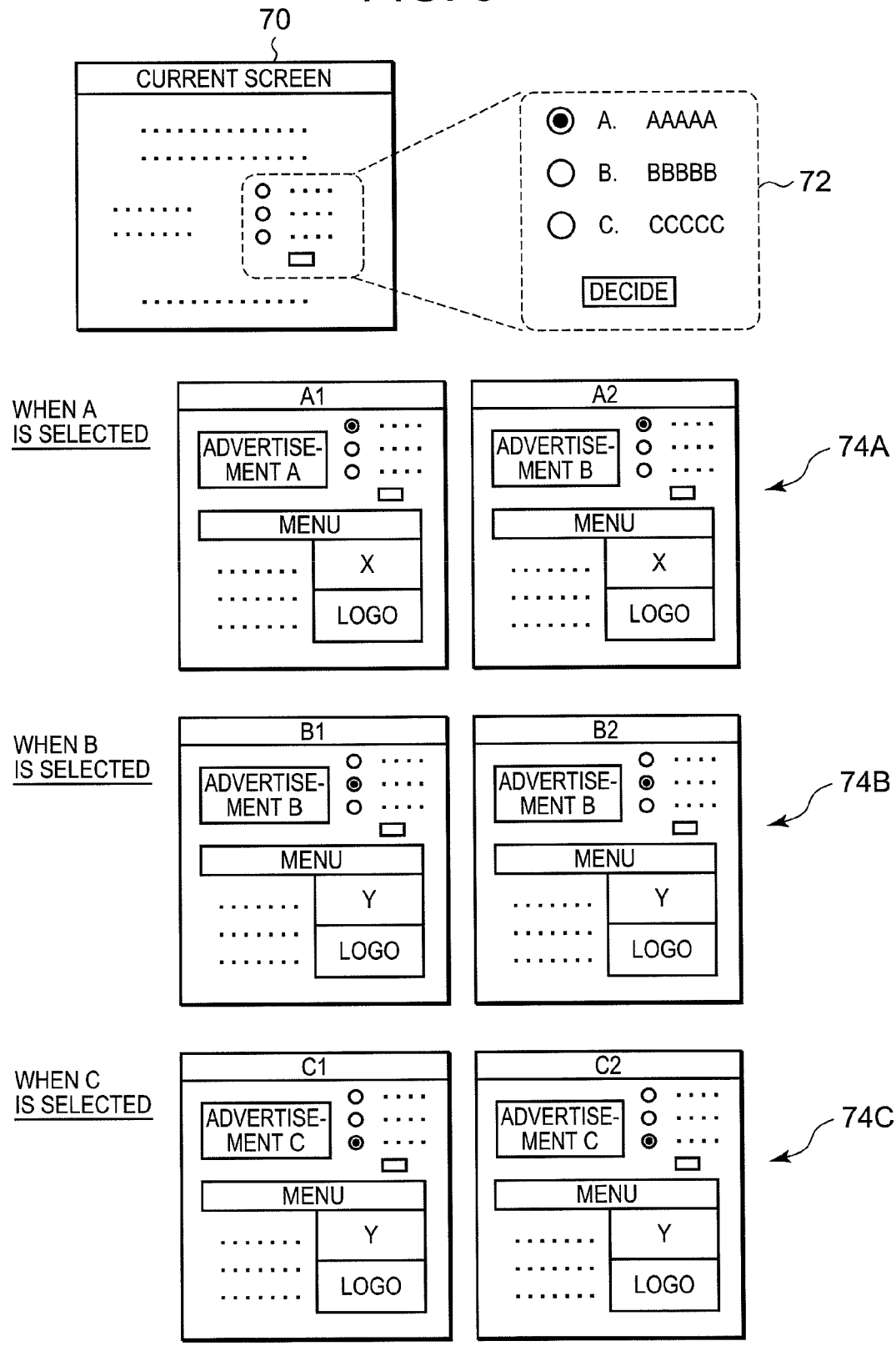
FIG. 3 is a diagram showing an example of emulation.

As shown in FIG. 1, the display information detecting unit 32 gets GUI information on the display screen from the GUI provision system 20 when various user operations are executed. That is, the display information detecting unit 32 functions as an emulator of a user operation. FIG. 3 shows an example of emulation by the display information detecting unit 32. For example, it is assumed that an operation part 72 having three options of "A" to "C" is displayed on a current screen 70. In this case, the display information detecting unit 32 gets GUI information provided when each option is selected, from the GUI provision system 20 multiple times for each option. FIG. 3 shows screens 74A to 74C which are displayed when "A" to "C" are selected at the operation part 72, respectively. The screens 74A displayed when "A" is selected are also referred to simply as the "screens A". A screen corresponding to GUI information acquired the n-th times, among the screens A, is referred to as a "screen An". The same goes for the screens 74B and 74C.

By comparing GUI information acquired by the display information detecting unit 32 multiple times, among screens, the priority order determining unit 34 determines priority order of the multiple display target parts included in a display screen. Then, the priority order determining unit 34 stores priority order information indicating the priority order of the multiple display target parts in the priority order information DB 36 in association with screen information indicating the display screen. The screen information includes, for example, identification information (for example, a URL) about a current screen and information showing an operation part on the current screen. The screen information may include identification information (for example, a URL) about the display screen itself.

Figure 4:
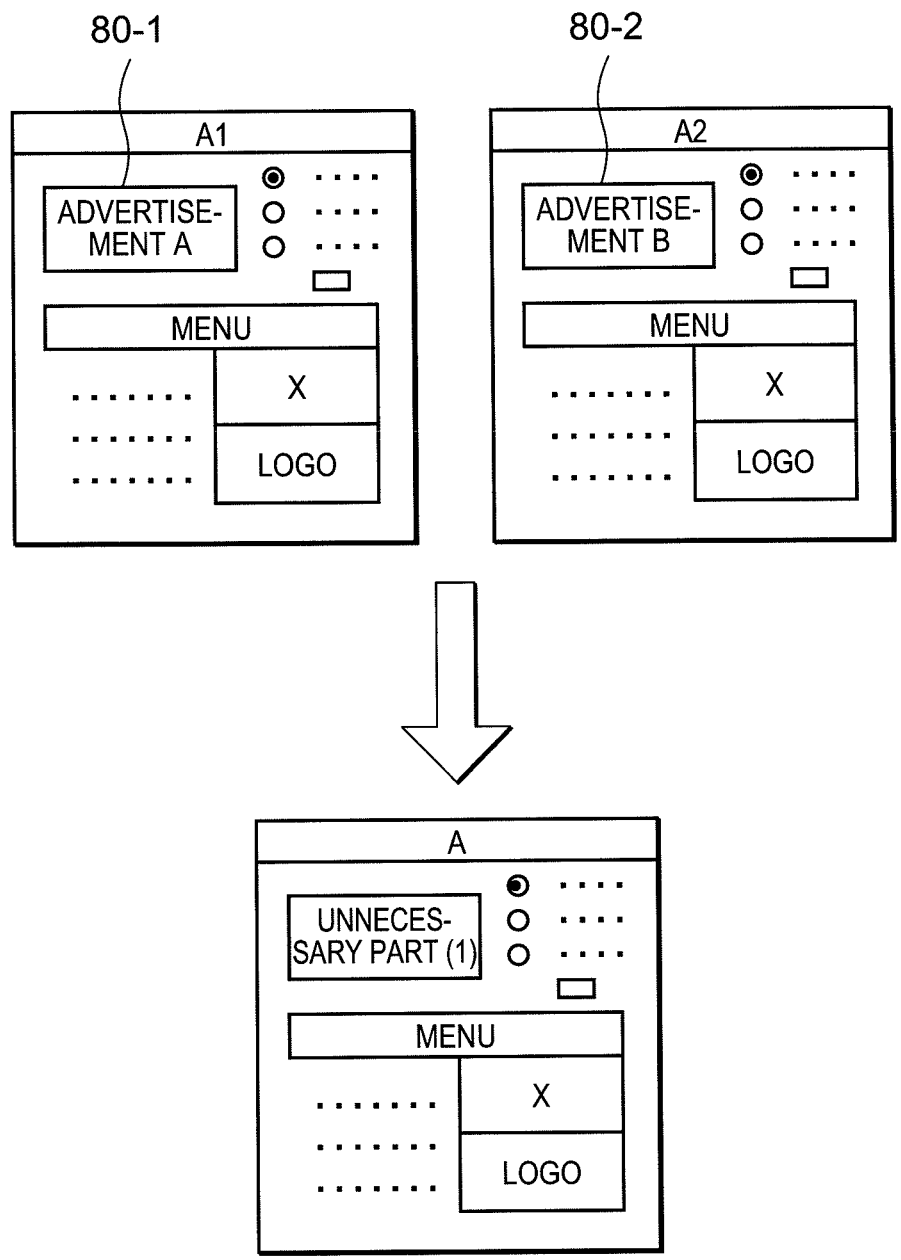
FIG. 4 is a diagram showing an example of the case of comparing GUI information between screens when the same user operation is performed.

FIG. 4 shows an example of the case of determining the priority order by comparing GUI information among screens when the same user operation is performed. The priority order determining unit 34 compares display contents at corresponding display target parts between screens A1 and A2 and detects whether there is difference between the display contents. For example, in the example in FIG. 4, display contents at corresponding display target parts 80-1 and 80-2 are different from each other. In this case, the priority order determining unit 34 regards information displayed at the display target parts 80-1 and 80-2 as information having little relation to the user operation, for example, a Web advertisement or a weather report. And the priority order determining unit 34 determines that the display target parts corresponding to the display target parts 80-1 and 80-2 are an unnecessary part. That is, the priority order determining unit 34 gives this display target part a low priority order for displaying on the display device 24.

Figure 5:
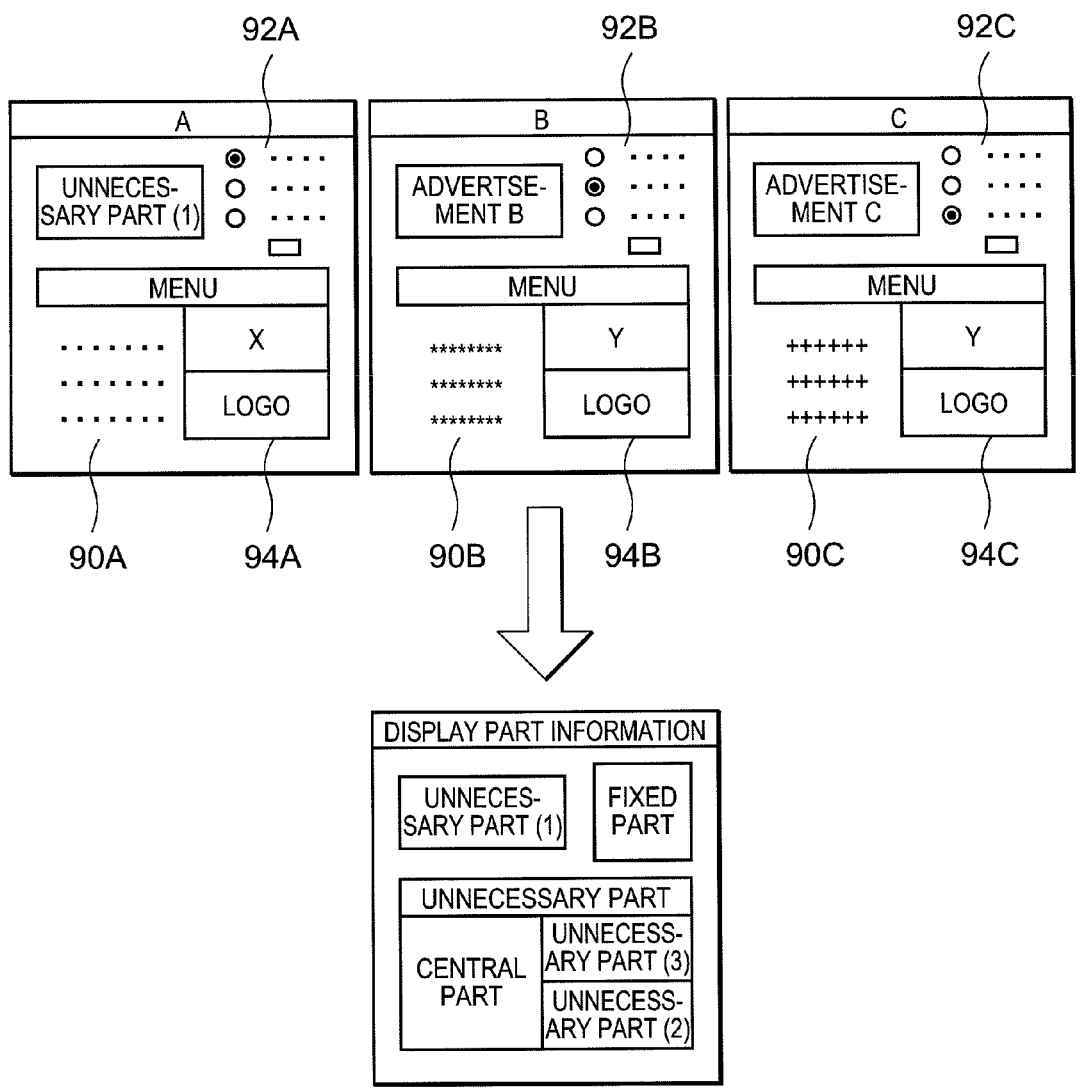
FIG. 5 is a diagram showing an example of the case of comparing GUI information among screens when different user operations are performed.

FIG. 5 shows an example of the case of determining the priority order by comparing GUI information among screens when different user operations are performed. The priority order determining unit 34 compares display contents at corresponding display target parts among screens A to C and detects whether there is difference among the display contents. For example, in the example in FIG. 5, display contents at corresponding display target parts 90A to 90C are different from one another. In this case, the priority order determining unit 34 regards a part which differs among all the operation patterns as information having much relation to the user operation. And the priority order determining unit 34 recognizes that the display target parts corresponding to the display target parts 90A to 90C are a central part. That is, the priority order determining unit 34 gives this display target part a high priority order for displaying on the display device 24. As for display target parts 92A to 92C, the priority order determining unit 34 determines that the display target parts corresponding to them are fixed because the same user operation at the operation part 72 is possible in the current screen 70 in FIG. 3. As for display target parts 94A to 94C, the priority order determining unit 34 regards the display target part corresponding to them as a part where information having little relation to the user operation is displayed because the display contents are the same among the screens A to C. And the priority order determining unit 34 determines that this display target part is an unnecessary part. As for display target parts where display information differs between a part of the screens A to C, the priority order determining unit 34 can set a higher priority, for example, for a display target part where there are fewer operation patterns having difference in display information and which is farther from the central part, among the display target parts. Each of the central part, the fixed part and the unnecessary part is not necessarily one continuous part. It may be constituted by multiple discontinuous parts.

In FIG. 1, the UI monitoring unit 38 monitors operation information outputted from the input device 22, detects a user operation which causes transition from a current screen to a display screen, and notifies a status indicating which operation part on which screen has been operated, to the display part extracting unit 40.

The display part extracting unit 40 detects an operation part where the user operation has been performed, on the basis of the notification from the UI monitoring unit 38. Then, the display part extracting unit 40 gets priority order information corresponding to the operation part where the user operation has been performed, from the priority order information DB 36. And the display part extracting unit 40 outputs the priority order information to the screen generating unit 42 together with GUI information of the display screen. The GUI information can be provided, for example, via the operation part detecting unit 30. The operation part detecting unit 30 performs detection of an operation part, with this display screen as a new current screen.

The screen generating unit 42 selects a display target part to be displayed on the display device 24 among display target parts included in a display screen, on the basis of GUI information of a display screen and the priority order information. And the screen generating unit 42 executes a screen generation process for displaying the selected display target part on the display device 24. An example of the selection of a display target part will be described with reference to FIGS. 6 to 9.

Figure 6:
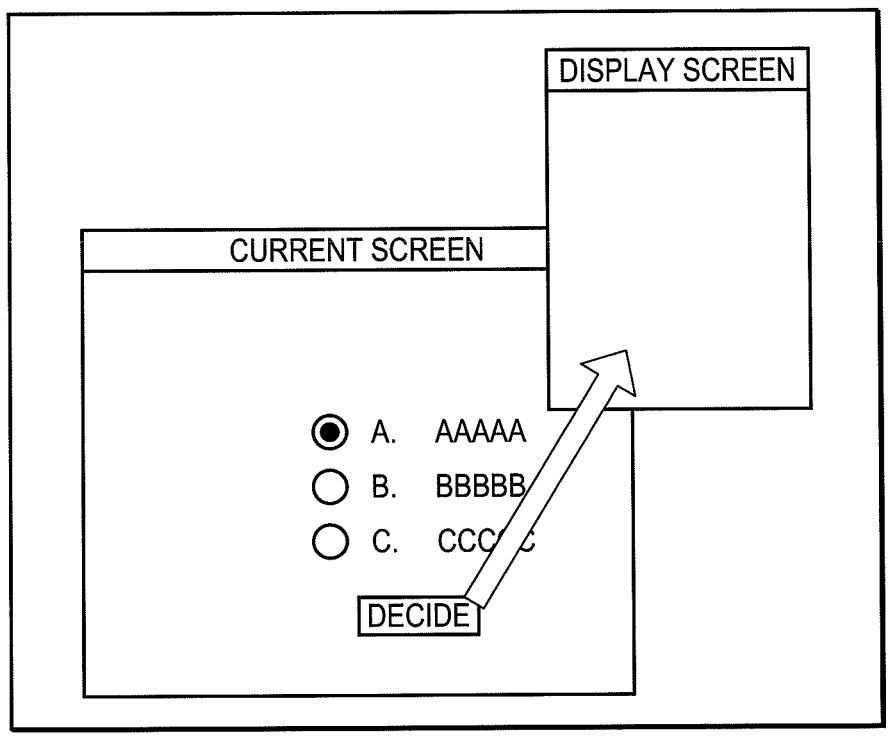
FIG. 6 is a diagram showing an example of case that a display screen is in the area different from the area of a current screen.
Figure 7:
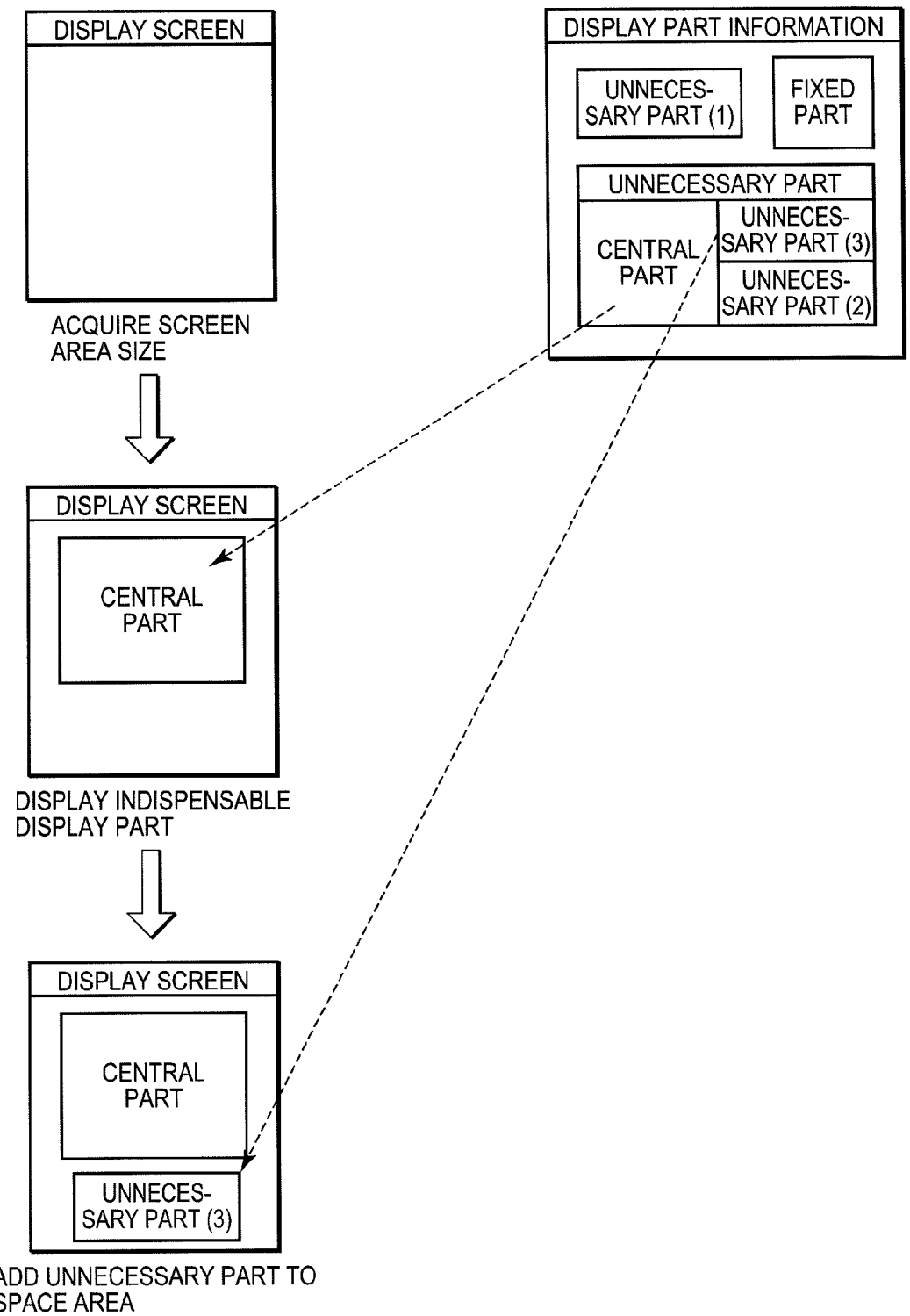
FIG. 7 is a diagram showing an example of extracting a display target part to be displayed on a display screen.
Figure 8:
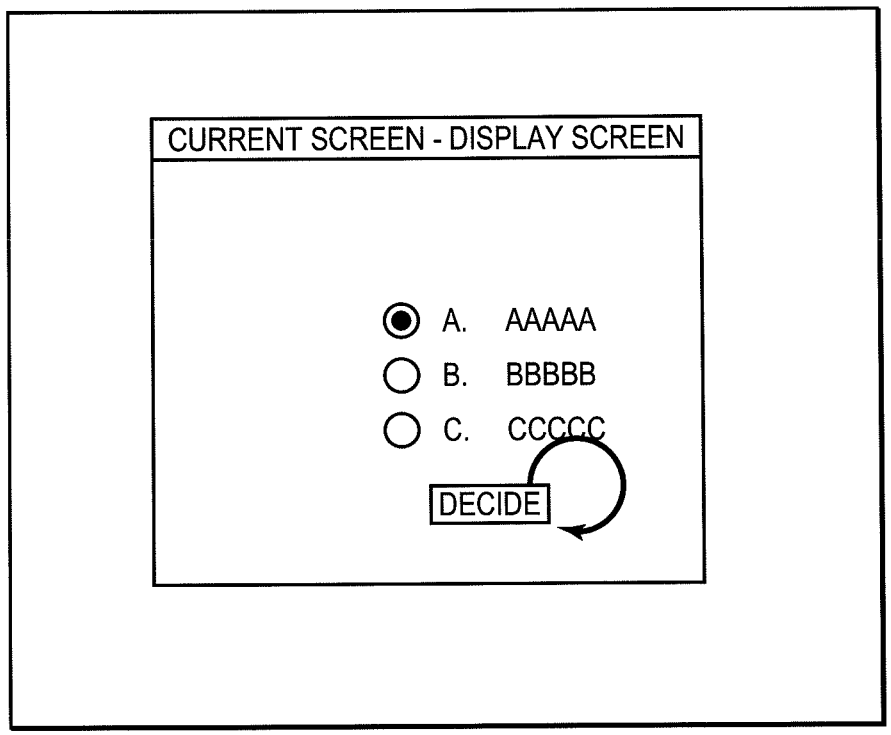
FIG. 8 is a diagram showing an example that a display screen is in the same area as the current screen.
Figure 9:
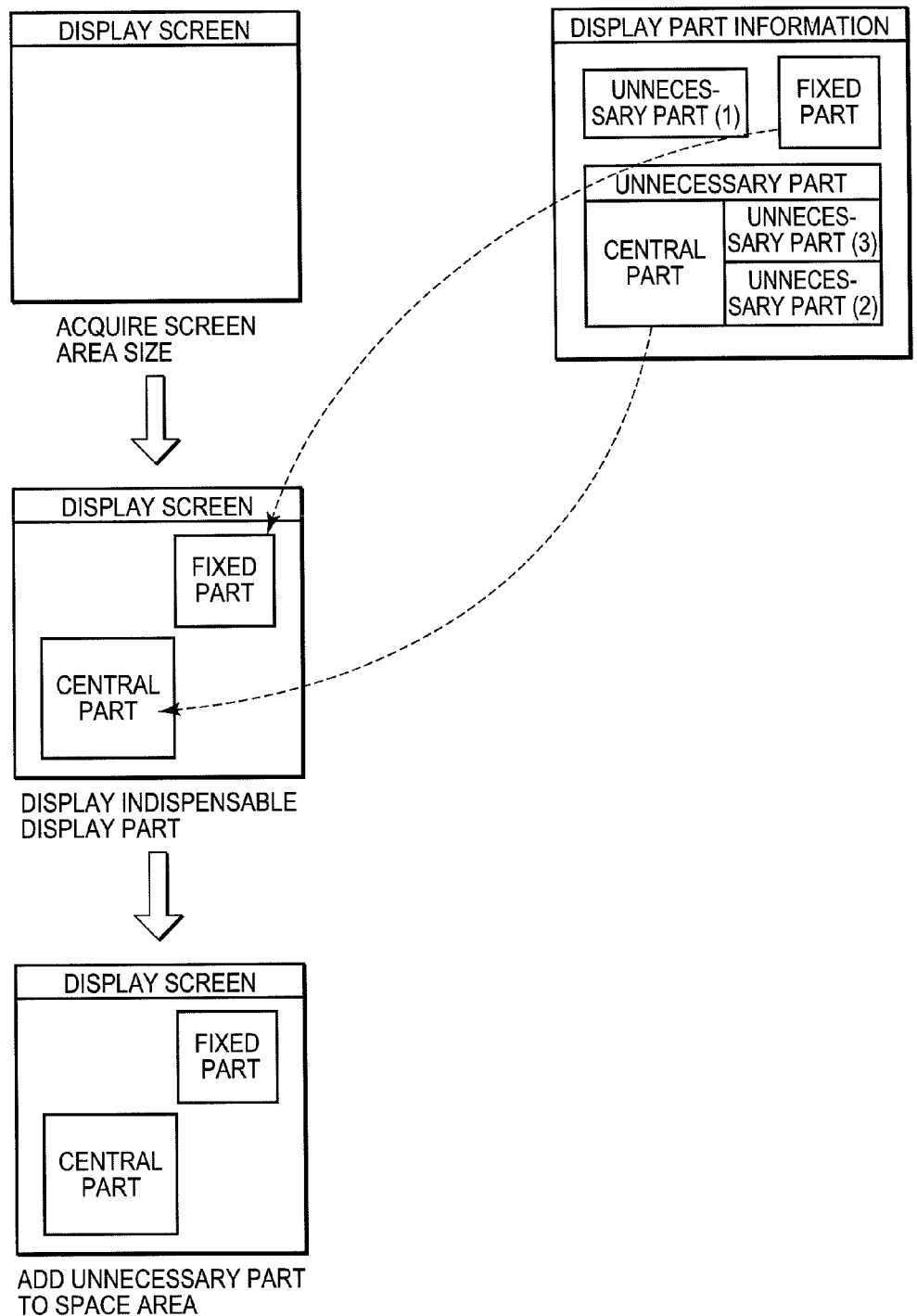
FIG. 9 is a diagram showing an example of extracting a display target part to be displayed on a display screen.

FIG. 6 shows an example of displaying a display screen as a pop-up screen or a dialog screen, in a screen area different from that of a current screen. In this case, the screen generating unit 42 displays a central part among display target parts included in the display screen as an indispensable display part which is a part required to be displayed, for example, as shown in FIG. 7. Furthermore, if there is still a space in the screen area for the display screen, the screen generating unit 42 displays other display target parts in accordance with the priority order. FIG. 8 shows an example of displaying a display screen in the same screen area as that of a current screen. That is, this is the case where display contents are updated in the same screen. In this case, the screen generating unit 42 displays a central part and a fixed part among display target parts included in the display screen as indispensable display parts which are parts required to be displayed, for example, as shown in FIG. 9. Furthermore, if there is still a space in the screen area for the display screen, the screen generating unit 42 displays other display target parts in accordance with the priority order.

The operation setting storing unit 44 stores parameters and the like for controlling various operations in the display part extraction apparatus 10.

Figure 10:
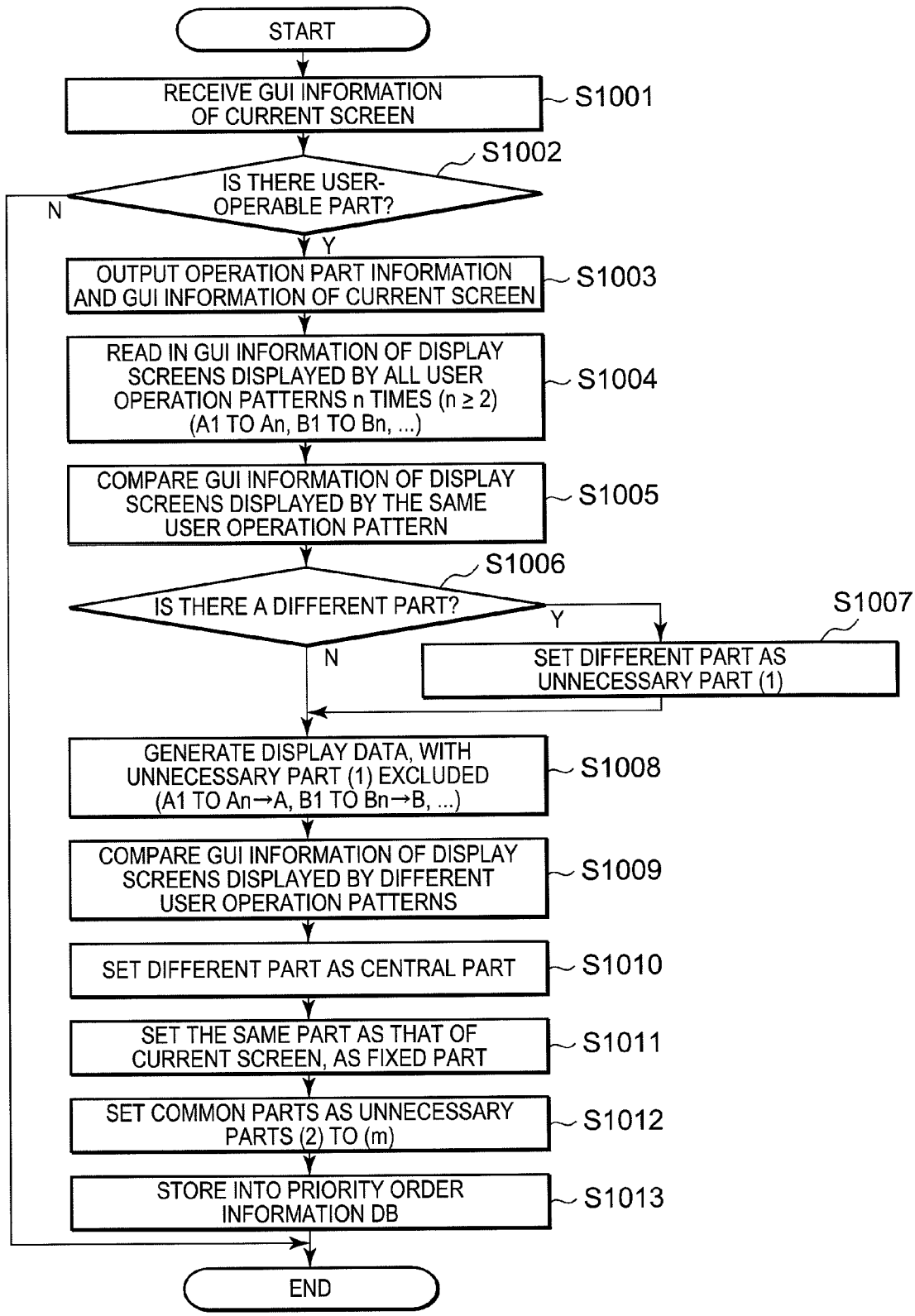
FIG. 10 is a flowchart showing an example of a process for determining priority order of display target parts.

Next, an example of a process in this embodiment will be described. FIG. 10 is a flowchart showing an example of a process for determining the priority order of display target parts. First, the operation part detecting unit 30 receives GUI information of a current screen, from the GUI provision system 20 (S1001). The operation part detecting unit 30 checks whether there are operation parts where a user operation is possible, among display target parts included in the current screen (S1002). If there are operation parts (S1002: Y), the operation part detecting unit 30 generates operation part information in which the operation parts are grouped (a group, b group, c group, . . . ) and outputs the operation part information to the display information detecting unit 32 together with the GUI information of the current screen (S1003). Here, grouping means to gather, for example, radio buttons for making a selection from among "A" to "C" and a "DECIDE" button for deciding a selection result in one operation part, as shown in FIG. 3. If there is not an operation part (S1002: N), it is determined that a determination of the priority order is unnecessary, and the process ends.

The display information detecting unit 32 extracts all user operation patterns at an operation part included in the current screen. For example, in the case of an operation part where only one user operation is possible, such as a radio button, a user operation pattern corresponding to each user operation is extracted. For example, in the case of an operation part where multiple user operations are possible, such as a checkbox, user operation patterns corresponding to all possible combinations of user operations are extracted. As a process for extracting a user operation pattern, for example, a method as described in Japanese Patent Laid-Open No. 10-198586 can be used. If there are multiple operation parts, a similar process is executed for each of the operation parts. Then, the display information detecting unit 32 repeats a process for transmitting input of an operation by each user operation pattern to the GUI provision system 20 and receiving GUI information of a display screen which is a response screen to the operation input, two or more times (n times) in the background, for example, as shown in FIG. 3. The display information detecting unit 32 manages, for each user operation pattern, GUI information acquired first (A1, B1, C1, . . . ) by the user operation pattern and GUI information acquired at the n-th time (An, Bn, Cn, . . . ) by the user operation pattern, using a two-dimensional array or the like, and transmits the GUI information to the priority order determining unit 34 together with the operation part information indicating operation parts (a group, b group, c group, . . . ) (S1004).

The priority order determining unit 34 performs two-stage determination. As the first stage, the priority order determining unit 34 compares the GUI information acquired by the same user operation pattern (S1005), for example, as shown in FIG. 4. FIG. 4 shows only comparison on the screen A shown when "A" is selected. However, similar GUI information comparison is performed for screens displayed by other user operation patterns. The first-stage comparison is comparison among the GUI information received by the same user operation pattern at differing timings. Therefore, if there is a display target part where display contents differ among the GUI information (S1006: Y), the priority order determining unit 34 determines that the display target part is a part where information having little relation to the user operation is displayed, and determines that the display target part is an unnecessary part (1) (S1007).

Then, the priority order determining unit 34 generates display data (A, B, . . . ) corresponding to the user operation patterns, with the screens A1 to An as display data A, the screens B1 to Bn as display data B, . . . , in a manner that the display part of the unnecessary part (1) can be recognized (S1008). As for the accuracy of different part determination (word level, sentence level, range or the like) and the accuracy of positional relationship (relative, absolute or the like), various methods can be used according to use purposes. In order to cope with the case where display order changes, such as in a search result of a search engine, for example, display at the top of the screen A1 is positioned at the bottom of the screen An, it is possible to adopt a method in which accuracy corresponding to the purpose can be expected by identifying comparison targets, for example, for each link.

Next, as the second stage, the priority order determining unit 34 compares the display target parts among the display data (A, B, . . . ) corresponding to the user operation patterns (S1009), for example, as shown in FIG. 5. The second stage is comparison among GUI information received in response to different user operation patterns. Therefore, as for a display target part where the display contents differ among all the patterns, the priority order determining unit 34 determines that the display target part is a part where information having the highest relation to the user operation is displayed, and recognizes the part to be a central part (S1010), unlike the first-stage judgment.

If there is a display target part where the same user operations at any of the operation parts on the current screen (a group, b group, c group, . . . ) is possible, the priority order determining unit 34 determines that such a part is a fixed part (S1011). If there is a part determined to be an unnecessary part (1) in a certain user operation pattern, the priority order determining unit 34 determines that the part is an unnecessary part (1) in the other user operation patterns.

As for a part where there is no difference among all the user operation patterns, the priority order determining unit 34 determines that the part is a common display target part which is not related to the user operation, and determines that the part is an unnecessary part (2) (S1012). Furthermore, as for parts where there is difference among a part of the user operation patterns, the priority order determining unit 34 performs determination, with the number of user operation patterns which include the difference and the distance from the central part as factors, and determines that the parts is an unnecessary part (3), an unnecessary part (4), an unnecessary part (5), . . . , an unnecessary part (m), in order beginning with a part where the number of user operation patterns which include the difference is the smallest which is the farthest from the central part (S1012).

Then, the priority order determining unit 34 stores priority order information in which information indicating the central part, the fixed part and the unnecessary parts is associated with the operation part information, in the priority order information DB 36 (S1013).

Figure 11:
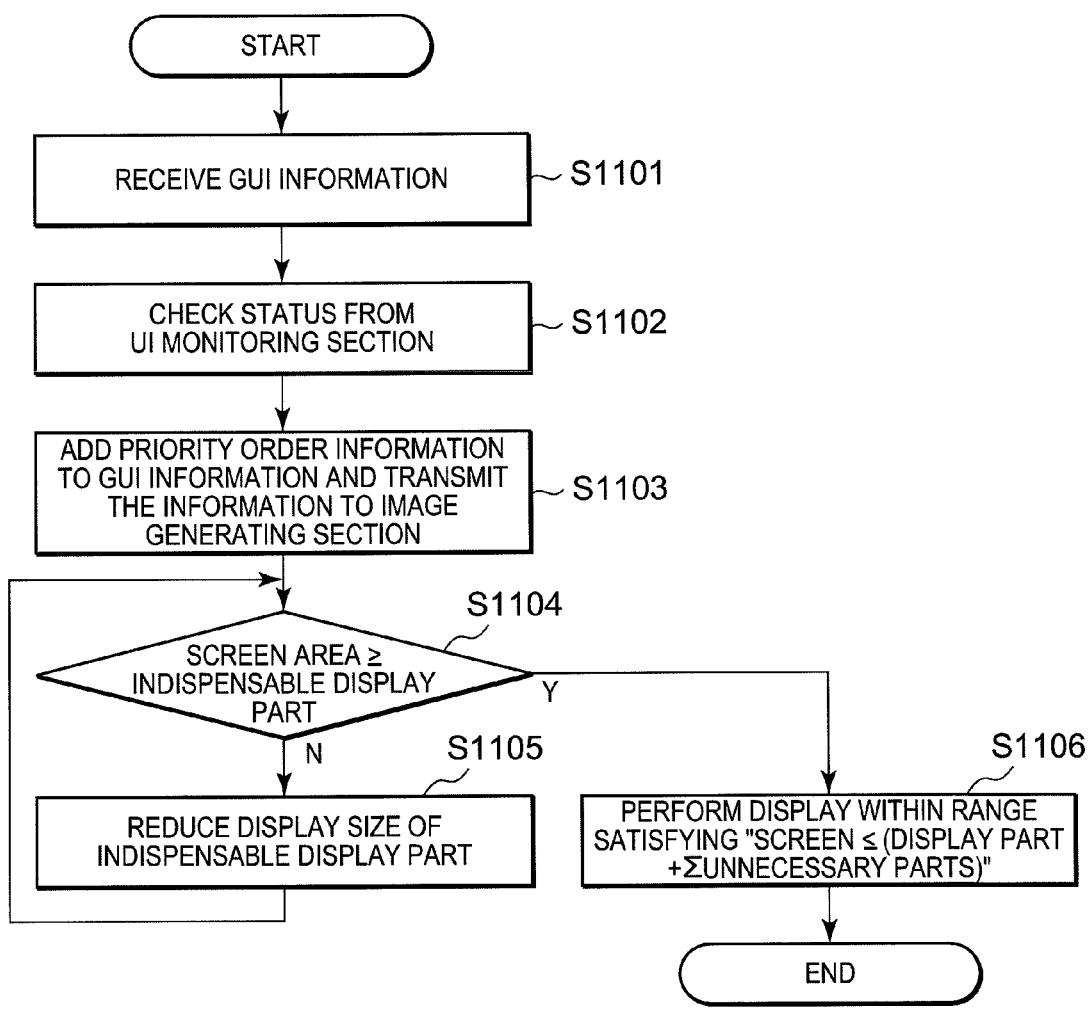
FIG. 11 is a flowchart showing an example of a process for generating a display screen.

FIG. 11 is a flowchart showing an example of a process for generating a display screen. First, the display part extracting unit 40 receives GUI information of a current screen (S1101). The operation part detecting unit 30 detects the GUI information of the current screen from the GUI provision system 20. The display part extracting unit 40 has received a status indicating at which operation part on which screen a user operation causing display of a screen was performed, from the UI monitoring unit 38, and holds the status. Then, the display part extracting unit 40 confirms the status for the GUI information (current screen) (S1102).

If receiving other GUI information from the operation part detecting unit 30 while a status for the GUI information (current screen) has not been notified from the UI monitoring unit 38 for a predetermined time period, the display part extracting unit 40 discards the process for confirming the status for the GUI information received first from the UI monitoring unit 38. If receiving a status of a user operation for the GUI information (current screen) from the UI monitoring unit 38, the display part extracting unit 40 gets priority order information about a corresponding operation part from the priority order information DB 36, transmits the priority order information to the screen generating unit 42 together with GUI information of a display screen, and changes the status for the GUI information of the current screen from the UI monitoring unit 38 to "none" (S1103).

If the priority order information about the corresponding operation part does not exist in the priority order information DB 36, the display part extracting unit 40 transmits only the GUI information to the screen generating unit 42. Thereby, it is possible to cope with the case that the determination of the priority order has not been completed or the emulation operation is prohibited.

The screen generating unit 42 compares the size of a screen area (a window, a pop-up, a dialog, a portlet or the like) for drawing the display screen in the display device 24 with the display size of an indispensable display part (S1104). In the case of "screen area<indispensable display part" (S1104: N), the display size of the indispensable display part is reduced until "screen area≥indispensable display part" is satisfied, for example, with the aspect ratio fixed (S1105). In this case, it is possible, for example, to control the reduction process on the basis of information indicating a threshold such as the minimum font size, which is stored in the operation setting storing unit 44 to secure visibility of characters. Such information may be outside the display part extraction apparatus 10. It is also possible to use, for example, information set for a Web page. For example, if "screen area≥indispensable display part" is not satisfied even if reduction is performed to the minimum size corresponding to the threshold described above, the display size of the indispensable display part is considered to have become the size of the screen area, and the reduction process ends.

If "screen area≥indispensable display part" is satisfied (S1104: Y), the screen generating unit 42 displays the indispensable display part in the screen area. Then, by adding the unnecessary parts to a space in the screen area in order of an unnecessary part (m), an unnecessary part (m−1), . . . within a range that "screen area≤(indispensable display part+unnecessary part (m)+unnecessary part (m−1)+ . . . )" is satisfied, the screen generating unit 42 displays the display screen on the display device 24 so that the whole screen area is filled with drawing (S1106).

There may be a case where it is desired to display all the unnecessary parts, depending on a purpose. Therefore, it is also possible to display the unnecessary parts as needed by providing a button for displaying all parts or a button for displaying an original page within the display screen.

Figure 14:
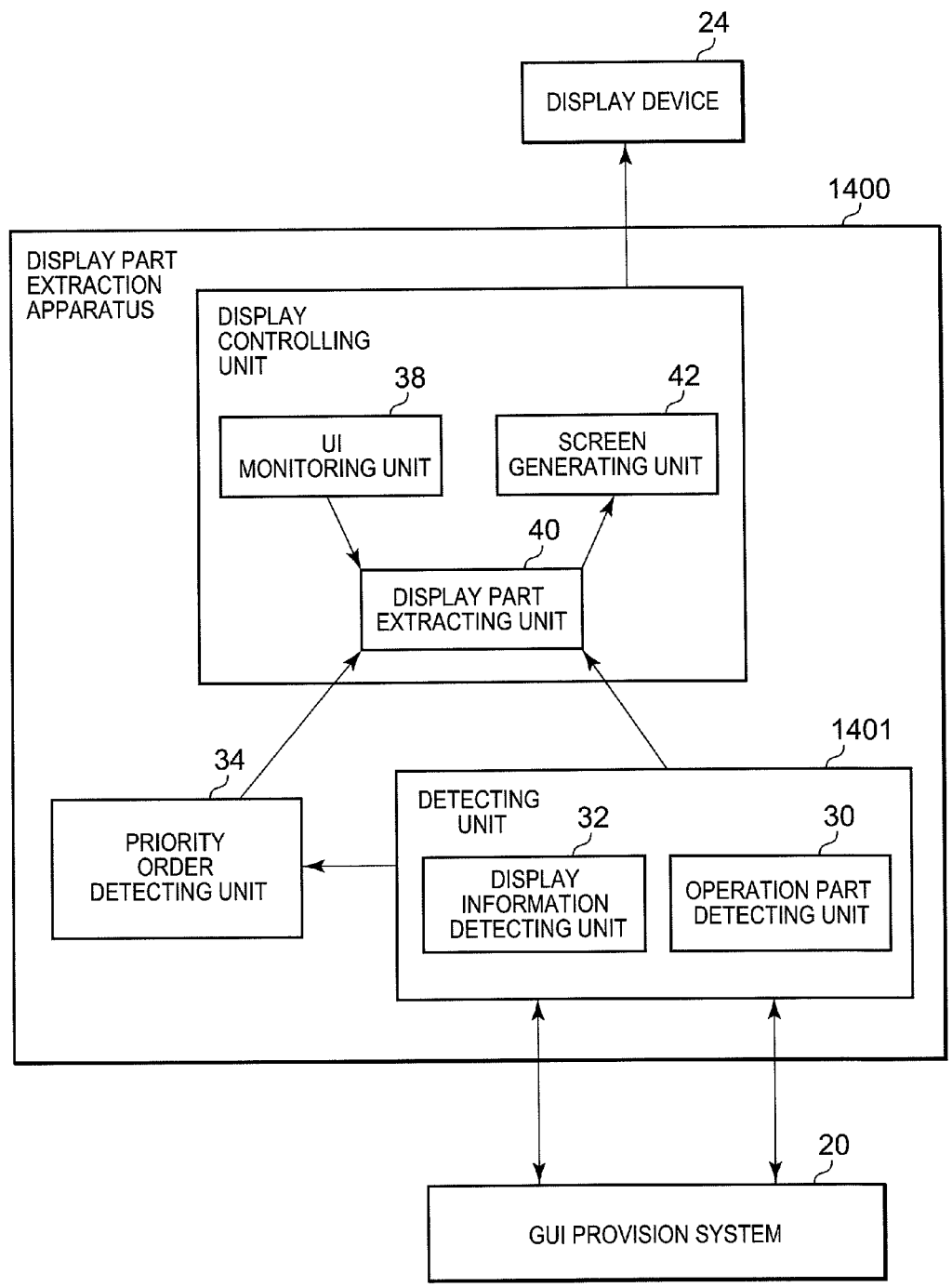
FIG. 14 is a diagram showing the configuration of a display part extraction apparatus in a variation of the first exemplary embodiment of the present invention.

FIG. 14 is a diagram showing a configuration of a display part extraction apparatus 1400 in a variation of the first exemplary embodiment of the present invention.

A display part extraction apparatus 1400 includes a display controlling unit, a priority order detecting unit 34 and detecting unit 1401. The display controlling unit includes a UI monitoring unit 38, screen generating unit 42 and a display part extracting unit 40. The detecting unit 1401 includes an operation part detecting unit 30 as a first detecting unit and a display information detecting unit 32 as a second detecting unit 30.

The GUI provision system 20 is connected to detecting unit 1401. The display device 24 is connected to display controlling unit 1400. The display part extraction apparatus has the same function as that of the first exemplary embodiment. Also, elements of the display part extraction apparatus 1400, that is to say, the display controlling unit, the priority order detecting unit 34, the operation part detecting unit 30 and the display information detecting unit 32 have the same function as that of the first exemplary embodiment. Therefore, a detail explanation is omitted here.

Next, another variation of the first exemplary embodiment will be explained below.

In processes shown in FIGS. 10 and 11, the priority order at the time of displaying display target parts is determined for all detected operation parts, and the display target parts displayed at the time of displaying the display screen are extracted in accordance with the priority order. However, for example, in the case of a screen for registration which influences a system, there may be a case where it is not desirable to extract and display a part of the display target parts. Therefore, the display part extraction apparatus 10 is also capable of controlling availability of determination of the priority order.

Figure 12:
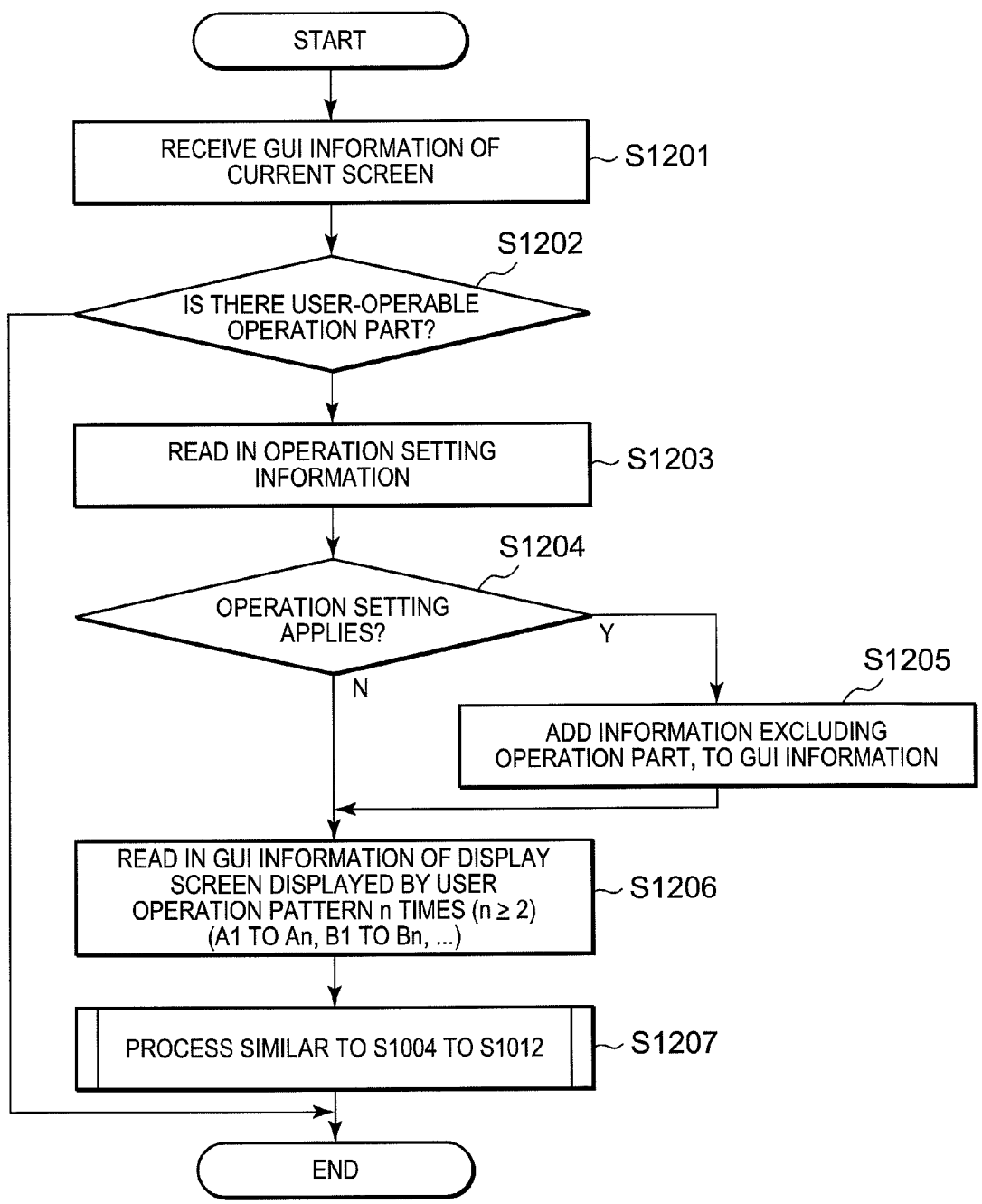
FIG. 12 is a flowchart showing an example of a process for determining the priority order of display target parts.
Figure 13:
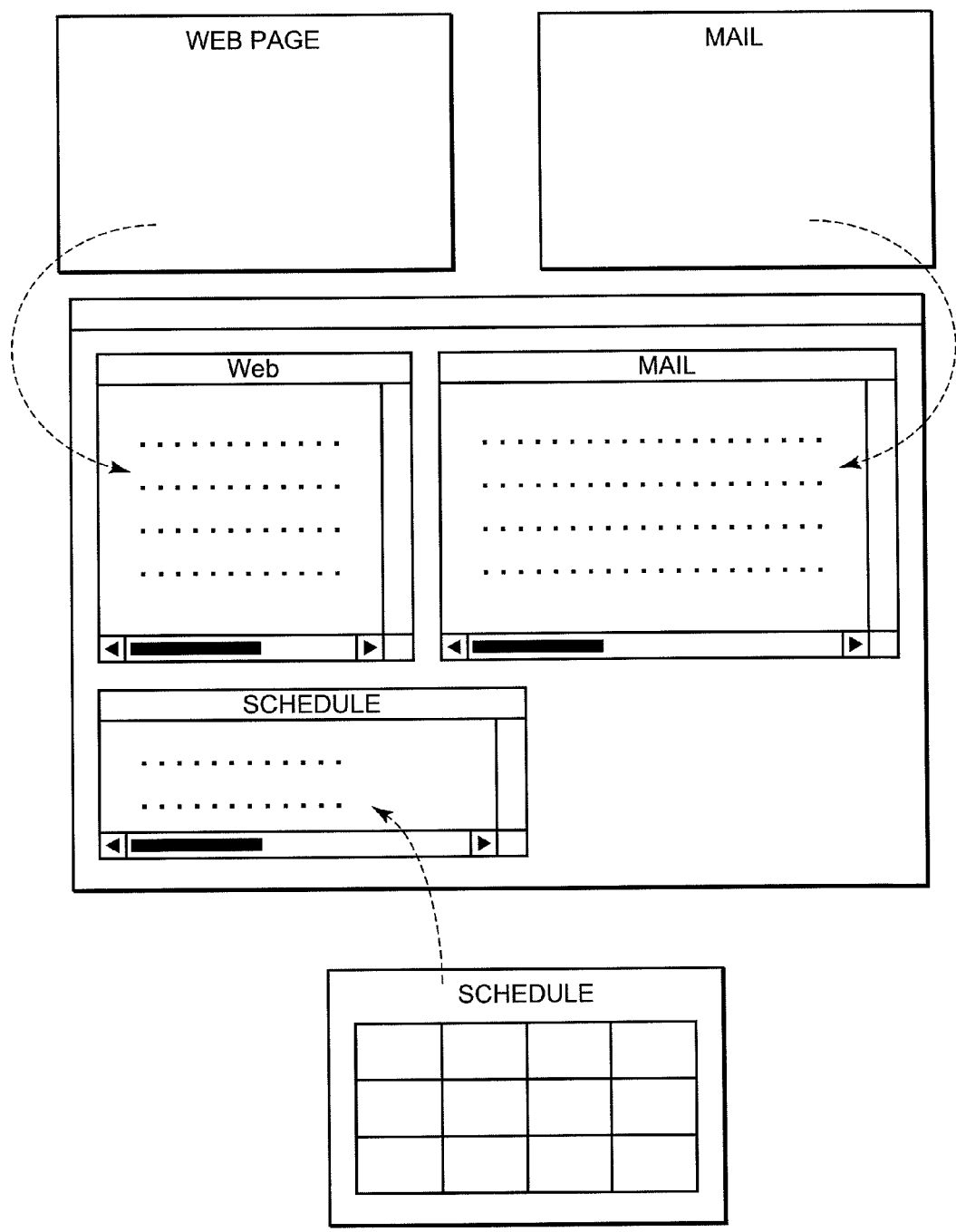
FIG. 13 is a diagram showing an example of a screen on which multiple windows and applications are displayed.

FIG. 12 is a flowchart showing an example of a process for determining the priority order of display target parts in consideration of the availability of determination of the priority order. Here, it is assumed that setting information controlling an emulation operation of a user operation (determination availability information) is stored in the operation setting storing unit 44. It is possible to register a character string, a numerical value or the like with the operation setting storing unit 44 as a condition for prohibiting the emulation operation. It is also possible to register the ID or URL of a screen to be displayed with the operation setting storing unit 44 as information indicating the condition for prohibiting the emulation operation.

First, the operation part detecting unit 30 receives GUI information of a current screen, from the GUI provision system 20 (S1201). The operation part detecting unit 30 determines whether there is an operation part where a user operation is possible among display target parts included in the current screen (S1202). If there is not an operation part (S1202: N), it is determined that determination of the priority order is unnecessary, and the process ends.

If there is an operation part (S1202: Y), the operation part detecting unit 30 refers to the operation setting storing unit 44 (S1203) and determines whether the operation part is an operation part for which emulation is prohibited (S1204). For example, it is possible to prohibit emulation if a phrase indicating a condition for prohibiting emulation, which is registered with the operation setting storing unit 44, is included at an operation part.

If the emulation operation prohibition setting applies (S1204: Y), the operation part detecting unit 30 adds flag information for excluding the operation part from emulation targets, to the GUI information and outputs the GUI information to the display information detecting unit 32 (S1205). If the emulation operation is prohibited (S1204: N), the operation part detecting unit 30 immediately transfers the GUI information to the display information detecting unit 32 as it is.

For operation parts other than the part excluded by the flag information, the display information detecting unit 32 gets GUI information of a display screen by each user operation pattern two or more times (n times) in the background (S1206). The subsequent process is similar to the process (S1009 to S1013) shown in FIG. 10.

An example of the display part extraction apparatus 10 in the present invention has been described above. According to the embodiments, it is possible to extract a part where information highly necessary for a user is displayed, without using information registered in advance. That is, it is possible to realize providing appropriate GUI information for a user without depending on his personal attributes. Therefore, the display part extraction apparatus 10 can be incorporated and used, for example, as a common basic technique in which imbalance of display data due to individual settings for each user or individual taste should not occur.

The exemplary embodiments are intended to facilitate understanding of the present invention and are not intended to interpret the present invention, limiting the present invention thereto. The present invention can be changed and improved without departing from the spirit thereof, and the present invention includes equivalents thereof.

What is claimed is:

1. An apparatus comprising:
    a detecting unit configured to detect an operation part in a screen;
    a priority order determining unit configured to compare a first screen and a second screen and determine a priority order of objects in the first and second screens based on a result of the comparing, wherein the screen is changed to the first screen by first operation of the operation part and the screen is changed to the second screen by a second operation of the operation part; and
    a display control unit configured to display at least one of the objects in the first and second screens on a display device based on the priority order.

2. The apparatus according to claim 1,
    wherein the display control unit changes the size or location of the displayed object based on the priority order.

3. The apparatus according to claim 1,
    wherein the first operation is different from the second operation, and
    wherein when an object on the first screen is different from an object on the second screen, the priority order determining unit sets a high priority for the objects on the first and second screens.

4. The apparatus according to claim 1,
    wherein the comparing includes a first comparing and a second comparing,
    wherein in the case that the first operation is the same as the second operation, the first comparing is executed, wherein in the case that the first operation is different from the second operation, the second comparing is executed, and wherein the priority order determining unit determines the priority order based on a result of both the first and second comparings.

5. A method comprising:

detecting an operation part in a screen;

comparing a first screen and a second screen, wherein the screen is changed to the first screen by first operation of the operation part and the screen is changed to the second screen by a second operation of the operation part;

determining a priority order of objects in the first and second screens based on a result of the comparing; and displaying at least one of the objects in the first and second screens on a display device based on the priority order.

6. The method according to claim 5, wherein in the displaying, the size or location of the displayed object is changed based on the priority order.

7. The method according to claim 5, wherein the first operation is different from the second operation, and wherein when an object on the first screen is different from an object on the second screen, a high priority is set for the objects on the first and second screens.

8. The method according to claim 5, wherein the comparing includes a first comparing and a second comparing, wherein in the case that the first operation is the same as the second operation, the first comparing is executed, wherein in the case that the first operation is different from the second operation, the second comparing is executed, and wherein the priority order is determined based on a result of both the first and second comparing step.

9. A non-transitory computer readable medium recording thereon a program that when executed by a processor carries out the following:

detecting an operation part in a screen;

comparing a first screen and a second screen, wherein the screen is changed to the first screen by first operation of the operation part and the screen is changed to the second screen by a second operation of the operation part;

determining a priority order of objects in the first and second screens based on a result of the comparing; and displaying at least one of the objects in the first and second screens on a display device based on the priority order.

10. The non-transitory computer readable medium according to claim 9, wherein in the displaying, the size or location of the displayed object is changed based on the priority order.

11. The non-transitory computer readable medium according to claim 9, wherein the first operation is different from the second operation, and wherein when an object on the first screen is different from an object on the second screen, a high priority is set for the objects on the first and second screens.

* * * * *